3,286,475
METHOD OF AGGLOMERATING AND STABILIZING PARTICULATE MATTER BY CHEMICAL TREATMENT
Nicholas M. Adams, Chicago, Ill., assignor to Nalco Chemical Company, Chicago, Ill., a corporation of Delaware
No Drawing. Filed Mar. 27, 1963, Ser. No. 268,436
20 Claims. (Cl. 61—36)

This invention relates to a method of treating particulate matter by chemical means whereby cohesive masses are produced. More specifically, the invention is concerned with a method of treating sub-divided materials such as soils, sands and the like with certain novel polymerizable mixtures, such that, when polymerization of the mixture occurs in the presence of such materials, resilient, flexible masses or aggregates of a combination of the polymerized mixture and matter are produced having exceptionally high strength, impregnability to water and water-insolubility.

Recently, much technological emphasis has been placed upon treating subdivided matter with various chemicals whereby the matter is bound into cohesive masses having improved resistance to external pressures of all types, whether exerted by human mechanical means or the forces of nature. This method of treating sub-divided matter, generically and loosely described as grouting, generally consists of contacting the matter with various organic monomers which are capable of polymerizing in the presence of such matter, and then allowing such polymerization to occur in the presence of the matter to bind the entire mass of matter and organic polymer into inter-mix masses of increased strength and resistance to external forces, particularly to water forces. For example, soil, commonly in a crumbled state of sub-division and susceptible to being swept away by water of any significant force, is first intimately contacted with polymerizable solutions. The mixture of soil and monomer after a certain period of standing is bound together by the polymerization reaction that occurs in situ. The effect of such treatment is to bind the soil into rubber-like masses or solidify it to a state whereby it is sufficiently cohesive to possess desirable qualities of impermeability and ability to bear high pressure loads, is rendered less pregnable to liquids such as water and is less susceptible to erosion by water and other natural forces.

A host of materials other than soil, whether naturally occurring or synthetic, if in the state of minute subdivision, may be likewise treated with polymerizing chemicals to produce coherent and cohesive masses of particulate matter intertwined with the now polymerized chemical. For example, finely divided sand, gravel, fluid muds, etc., may be suitably subjected to the chemical whereby desired states of cohesiveness and strength are produced. The sub-divided matter, as mentioned above, may be created synthetically, or may occur naturally either on the surface of the ground or in subterranean areas. Thus, soil existing on the surface may be suitably treated with the chemical grouting chemicals, or likewise, earth adjacent to passages beneath the surface of the earth may be desirably strengthened by such treatment. In the latter case, such passages are thereby stabilized against cave-ins or sliding.

The over-riding theme in all such cases of chemical treatment of particulate matter is to produce masses of sufficient strength to withstand continually applied man-made pressures or ever present forces of nature. While many prior art chemical treatments exemplified by the type in which certain organic monomers are polymerized in the presence of the particulate or sub-divided matter have shown promise, certain deficiencies in such treatment are present, particularly in not fully meeting the desired standards and not having the extremely beneficial property of imparting exceptional high strength to the matter. Another drawback in such prior art chemical treatment is that while agglomerates of passable strength are initially produced, upon long-term application of forces and pressures such as continual flow of water, the agglomerated masses tend to thereby break down and disintegrate. Thus, the stabilized formations are only of relatively short-term duration. Likewise, in some instances the particulate matter may be formed into the desirable flexible cohesive masses, but gradually lose the moisture retained therein and have a tendency to crumble back into the undesired state of sub-division. Again, while some chemical treatments are useful in treating certain types of sub-divided matter, they are partially or sometimes wholly ineffective in treating matter of a different chemical-physical constituency. For example, some prior art treatments may be useful in binding together such materials as soil or other types of matter containing appreciable amounts of humus, but are relatively inefficient in forming agglomerates of matter containing large amounts of inorganic material such as siliceous formations typified by sand. At best, some prior art treatments only form inferior low-strength gels or agglomerates of certain particulate matter as soil and the like. These gels are generally unable to withstand the pressure flow and erosion of vast moving bodies of water. Particularly, beach sand has been found to be a particularly troublesome problem and difficult to gel to substantial strengths.

Untreated beach sand, subject to destructive waves and particularly those of the oscillating types is frequently swept away, causing shore erosion problems of great magnitude. Unless checked, waves of translation and oscillation which develop a great force, estimated to be between one to three tones per square foot of beach during storm conditions have a tendency to measurably decrease the depth of sand beaches. Prior art chemical materials have not been able to prevent to any substantial degree erosion by water of sandy beaches.

To overcome this problem, a method of increasing water-retaining properties of the formed agglomerates has been disclosed in U.S. Patent 3,056,757 wherein certain water-soluble metal salts such as calcium nitrate, calcium chloride and the like have been introduced along with the polymerizable organic monomer. The cohesive masses of bound particulate matter, while retaining their flexibility due to increased retention of water, still do not have the extreme degree of strength necessary in effective grouting treatments. The above type salts while increasing water-retaining properties of formed agglomerates of particulate matter, do not have the requisite strength and, as disclosed in U.S. Patent 3,021,298 are inferior to soil treatment of polymerizable monomer in combination with ions such as aluminum and chromium. In the latter disclosure, it has been found that soils and the like may be somewhat strengthened by addition of trivalent metal ions of aluminum and chromium when used in combination with a prior art treatment of acrylamide and acrylate monomer combination along with a cross-linking agent, alkylidene bisacrylamide. It has been determined that even with benefit of additional strengthening agents such as the above, extremely high strengths cannot be imparted to particulate matter to form agglomerates or masses. Particularly, this is true in such areas as prevention of severe shore erosion. Unless a beach is treated with suitable grouting materials whereby exceptionally high strength sand gels are produced, the above problems are not solved to any substantial degree and beach depths cannot be maintained. Not only must the sand in beach areas be gelled to high strength such as by polymerization of various agents in the presence of such sand, but also the formed gels must not dry out and thereby disintegrate to their former sub-divided condition. Thus the formed gels must have exceptional strength concomitant with the property of water retention within the gel, whereby long-term gel formation and flexibility is sustained. As an alternative, the gel must at least maintain its hardened integral character even though water is slowly lost through the gel structure. A chemical treatment must be able to impart all the above desired characteristics to sand gels formed in the chemical's presence.

It would, therefore, be a benefit to the art if a method were available for agglomerating or aggregating particulate matter into high strength cohesive masses such as sand gels able to withstand high pressure flow of various liquids, particularly water. Further advantages would accrue if such chemical treatment were available whereby the agglomerates or aggregates of particulate matter had the ability to remain flexible by means of retention of water, and thereby maintained the desired property of strength for long durations of time. If such particulate matter could be chemically treated whereby high strength property concomitant with excellent water retention, water-impregnability and water insolubility were attained, such a treatment would find ready acceptance in the art. Also if the above desirable properties were able to be achieved with respect to a host of subdivided matter, inorganic and organic, synthetic and naturally occurring, without respect to varying characteristics of chemical and physical properties, such a chemical treatment would be a substantial step in the development of grouting techniques. Thus, if any single chemical treatment imparted such above desired properties to sub-divided particles, which qualities lasted over long periods of time, and could be achieved by simple, efficient and economical process means, this would be extremely useful. Lastly, if the method were widely adaptable to a variety of situations, and could be modified to suitable treatment of particulate matter such as surface and underground earth formations, it would be a substantial improvement of prior art methods which lack one or more of these desirable and sometimes essential, attributes of applicability and/or efficiency.

Based on the above, it becomes an object of the invention to provide a process of aggregating particulate matter into masses characterized by exceptional strength and water-impregnability.

Another object of the invention is to provide highly cohesive and strongly bonded agglomerates of matter which had formerly existed in state of fine sub-division.

Yet another object of the invention is to provide a process of aggregating naturally occurring particulate matter by contact with novel ploymerization mixtures added in either slurry, dry or aqueous solution states whereby the combination of particulate matter and polymerizable mixture after polymerization has been affected is converted to a unitary substantially water-impregnable mass of superior strength heretofore unattainable by prior art methods.

Still another object of the invention is to provide novel polymerization mixtures useful in carrying out the above process of aggregation.

A still further object of the invention is to provide a method of stabilizing soil compositions by treatment with a polymerizable mixture whereby the resultant composition has materially decreased permeability to inert aqueous liquid such as water, enhanced load-bearing qualities and substantially decreased susceptibility to erosion.

Another object of the invention is to provide a method of sealing porous earth formation adjoining earth channels artifically or naturally produced, by contact of said earth with novel polymerizable mixtures.

It is another object of the invention to provide a method of sealing strata in earth by injection therein of certain mixtures capable of polymerization in the presence of the earth, such process being particularly useful in drilling operations.

A special object of the invention is to provide a process of aggregating sands into gels of exceptionally high strength, water insolubility and water impregnability by contacting the sand with various mixtures capable of polymerization in its presence whereby the gel sand masses are capable of resisting the pressure flow of waters, in specific areas of gel formation and adjacent thereto.

Still another object of the invention is to provide sand gels having the above properties, which maintain these properties along with attributes of flexibility and mechanical integrity for long durations of time even when subjected to continual eroding stress of flowing water.

Other objects and advantages in the invention will be apparent to those skilled in the art upon further consideration of the invention discussed in detail hereinbelow.

In accordance with the invention it has been discovered that particulate matter may be treated with certain polymerizable mixes whereby the matter is agglomerated or aggregated into cohesive masses having higher gel strengths than heretofore attainable by prior art methods. In its most general aspect the invention comprises the steps of contacting the particulate matter in the presence of water with a polymerizable mixture containing an acrylamide based monomer, a cross-linking agent capable of reaction with acrylamide, a catalyst and an alkaline earth metal compound in the form either of a hydroxide or an oxide, and then effecting polymerization of the above mixture in the presence of the particulate matter whereby the matter and mixture are converted to a substantially water-impregnable mass, which mass possesses superior strength, and is able to withstand moving forces such as water for a considerable duration of time and of relatively high magnitude of force.

The particulate matter which may be treated may be selected from a wide variety of inorganic and organic substances, synthetic and naturally occurring. By the term "particulate matter" is meant any substance in a subdivided state or existing as fine particles. Among the type of materials which may be solidified into large cohesive masses are soil, clays, heavy fluid muds, sands, crushed granite, cement, silts, loams, peat, organic matter and inorganic matter in a particulate state such as humus, siliceous compounds, etc. For example, when soils are treated whether they be topsoil or subterranean formations, the agglomerates formed by polymerization of the above defined polymerizable mix in the presence of the soil helps to improve aeration, moisture retention, tilth, porosity, water absorption, etc. Particularly, the soil so treated has a substantially reduced tendency to erode when acted upon by flowing bodies of water, wind and other destructive forces of nature. The thus stabilized soil has sufficient strength and cohesiveness when the polymerization mixture is reacted in its presence so that a continuous resilient rubber-like mat is formed composed of polymerized matter and soil. The flexible mat has measurably increased load-bearing qualities and is suitable for use in building highways, airplane runways, earth dams, specialized military purposes, etc. Other benefits imparted to the soil include better crop yield, decreased surface evaporation and better fertilizer utilization. Thus, it is seen that the invention is especially useful in treating soil which is used for highway and railroad road beds or other types of topological structures used to support heavy vehicles.

When the soil is solidified or cohered into large agglomerates or aggregates, it is rendered far less pregnable to liquids and becomes substantially water-insoluble or impervious to dispersion by water flow even when such flow has developed exceedingly high pressures. Thus, soil so treated when used as dams or levees prevents percolation of water therein. Likewise, leakage of water into tunnels or into oil wells through porous earth strata is substantially inhibited. Treatment of soil adjacent to foundations of homes thereby prevents entrance of water into home basements or cellars. The invention also finds used in excavating and trenching operations whereby the soil or other earth formations adjacent to such openings have improved strength and lower pregnability to water via the polymerization mechanism in their presence. Thus the soil surrounding such subterranean foundations is stabilized or anchored into place by the agglomerating process. This sealing effect has a strong tendency to prevent cave-ins or sliding and the soil formation maintains its desired integral character.

The invention is likewise useful in drilling operations. For example, drilling muds may be treated with the polymerizable mixture and have their viscosity therefore increased due to the agglomerating action of the mix. Thus, the muds are prevented from being lost through porous earth strata. Likewise, in drilling operations when casings or liners are placed in the channel well, these may be cemented in place by treating the soil just adjacent to these casings or liners. The compacted or densified earth formation adjacent to the casing then, in effect, helps to fix the liners or casings in place.

Likewise, earth or soil formations which are used as linings for reservoirs, irrigation ditches, etc., may be treated with the polymerizable mixture of the invention whereby they have increased resistance to the moving bodies of liquid constantly in pressure against the soil. The soil is thereby made flexible and rubbery and has increased shear strength and little or no tendency to form a sol, emulsion or a suspension in water, thereby resisting its flow. The invention is also suited to grouting mine shafts or other excavations. An important feature of this invention is connected with grouting of sea-walls to prevent suction of the fill behind the wall and thus to prevent the wall from collapsing. Grouting behind the wall stops the fill from being washed at the bottom and prevents collapse of the ground held by the wall.

In the broadest aspects of the inventive method the polymerizable mixture may be either applied as a grout solution or mixed with the particulate matter such as soil and thereafter polymerized in situ in the presence of water which either normally exists in the particulate matter or is added thereto. It is evident that the particulate matter somehow enters into the structure of the polymerizing mixture or vice versa and is not merely an inert filler. Only through such inclusion of the particulate matter itself in the polymerization reaction could a solid coherent mass be produced having highly strengthened properties. Most probably, the polymerizing mixture at the time of reaction penetrates into the pores and voids of the particulate matter structure and thereafter the combination so formed, sets in a 3-dimensional structure having the desired rubber-like properties and high strength.

As broadly mentioned above, the polymerizable mixture includes acrylamide as one of the ingredients. By the term "acrylamide based monomer" is meant the sole chemical alone or any combination of one or more polymerizable ethylenically unsaturated comonomers which may be added along with the acrylamide and may be suitably interpolymerized with acrylamide in the presence of the particulate matter.

It is preferred that these comonomers be sufficiently soluble in water so that when interpolymerized with acrylamide the resultant monomer mix has the necessary water solubility so that polymerization may be easily effected in the presence of water and particulate matter.

Almost any type of hydrophilic water-soluble ethenoid monomer may be used in conjunction with the acrylamide. Among these are acrylic acid, alkyl esters of acrylic acid such as methyl acrylate etc., salts of acrylic acid and particularly alkaline earth and alkali metal salts such as sodium acrylate, magnesium acrylate, etc., as well as diethylamine acrylate. Likewise, compounds such as acrolein, methacrylic acid, maleic acid and derivatives thereof, such as esters, salts, etc., vinyl sulfonic and vinyl phosphonic acids may be used. Other compounds include trimethylamine methacrylate, diethyl methylene succinate, methyl isopropenyl ketone, ethyl vinyl ketone, vinyl acetate, vinyl pyrrolidone, allyl alcohol, sulfonated styrene, vinyl pyridine, maleic anhydride, sodium maleate, N-allyl amines, vinyl sulfonic salts, allyl amines, and various other ethylenically unsaturated compounds having a wide variety of hydrophilic radicals.

It is preferred that when a combination of acrylamide and one or more comonomers is used, that the acrylamide be present in an amount of at least 20% by weight. More preferably, when used in combination with comonomers, the acrylamide constituent varies from 50 to 99% by weight and most preferably from 60 to 95% by weight. In the most preferred aspect of the invention, however, acrylamide is used as a sole monomer, although use of one or more other above type monomers in conjunction with acrylamide is not precluded. Compounds which form acrylamide in situ may also be employed in its stead. Thus, for example, acrylonitrile may be employed and contacted with the particulate matter to be treated along with a source of sulphuric acid. The nitrile is thereby hydrolyzed into the acrylamide sulfate salt which in turn may be neutralized by the alkaline earth metal hydroxide or another basic material to acrylamide or merely polymerized in its sulfate form. For sake of simplicity, acrylamide or a mixture of acrylamide and one or more additional monomers will be referred to hereinafter as acrylamide.

The next ingredient in the polymerization mixture used to carry out the aims of the invention is a cross-linking agent capable of reaction with acrylamide or any of the above combinations of acrylamide and comonomers. Generally, these compounds have a structure such that various groups in the compound are capable of reacting with the acrylamide or acrylamide and comonomers during the polymerization reaction itself such that cross-linking is effected. Such cross-linking agents may be either ethylenically diunsaturated compounds themselves or have reactive groups which are capable of chemically attaching to the amide groups of acrylamide and thereby bridging the various linear chains formed during the polymerization, creating in toto a 3-dimensional gel network completely impervious to water. The particular matter which is in intimate contact with polymerization mixture during such reaction is thus entrapped in the 3-dimensional network and a rubbery gel thereby produced. Typical cross-linkers may include formaldehyde, allyl acrylate, monoallyl acrylamide, diallyl acrylamide, alkylidene bisacrylamides, etc. Preferred among these are the alkylidene bisacrylamides which are fully described in Lundberg Patent 2,475,846, which disclosure is herein incorporated by reference. Preferred among the alkylidene bisacrylamides is N,N'-methylene bisacrylamide.

Another necessary ingredient in the polymerizable mixture is a catalyst. Both a single catalyst such as a water-soluble oxygen-containing catalyst, e.g., ammonium, potassium and sodium persulfates, hydrogen peroxide, the alkali metal and ammonium perchlorates, etc., may be used as well as the known 2-component redox catalyst system. In the latter system, water-soluble peroxy catalysts such as persulfuric, perboric, perchloric and permanganic acids, as well as their salts may be suitably employed as the oxidizing component. Particularly, ammonium, potassium and sodium persulfates, hydrogen peroxide and, the alkali metal and ammonium perchlorates may be used as oxidizing reagents. As the reducing component silver nitrate, nitrilotrispropionamide, sodium thiosulfate, sodium or potassium bisulfite, thiosulfate or metabisulfite may be used. Preferred is the one component system and more preferably the water-soluble persulfate salts. Most preferably ammonium and alkali metal persulfates are employed. Since the one-component catalyst system has a lesser tendency to speed up the polymerization reaction than does the redox system, it is preferred as providing greater control of the polymerization and process as a whole.

The last essential ingredient going to make up the polymerizable mixture is an alkaline earth metal compound, either an alkali earth hydroxide or oxide. This particular reagent, which is essential to impart to the gelled particulate matter the requisite strength, may be chosen from among such compounds as calcium hydroxide, magnesium hydroxide, barium hydroxide, strontium hydroxide, barium oxide, calcium oxide, strontium oxide, or some combination thereof. Due to low cost, availability and excellent activity in promoting gel strengths of agglomerated matter, calcium hydroxide is preferred. Calcium oxide which of course, in presence of water forms the corresponding hydroxide is the preferred oxide additive.

The mode of addition of the various components of the polymerizable mix to the particulate matter may be widely varied without departing from the scope of the invention, although as will be discussed later, some addition techniques give enhanced results. For example, all the constituents of the mix may be intermixed and the entire mixture added to the particulate matter in one step. Also one or more of the various components may be mixed, and these premixes then added to the matter which is desired to be aggregated. All are essential, however, in forming the appropriate cohesive masses of matter with their resultant desired property of high agglomerate strength. Regardless of the mode of addition to the particulate matter, it is preferred that the combination of ingredients which make up the polymerizable mixture be composed of at least 10% by weight of acrylamide or comonomer mixture based on the entire weight of polymerizable mixture. Likewise it is preferred that the polymerizable mixture contain at least 10% by weight of alkaline earth metal compound. Also, preferred polymerization mixes in contact with the particulate matter should contain at least 0.1% by weight of the cross-linking agent based on the total mixture weight, and at least 0.2% by weight of catalyst. The most preferred polymerization mixes comprise 10–49% by weight of acrylamide or acrylamide in combination with one or more of the above enumerated comonomers, 0.1–4.0% by weight of cross-linking agent, 0.2–8.0% by weight of catalyst, and 10–49% by weight of alkaline earth metal compound.

Particulate matter such as soil, sand, gravel, etc., after contact with the polymerizable mixtures of the invention form a treated composition in which the ratio of polymerizable mixture to particulate matter preferably ranges from 0.5:100 to 50:100 and most preferably ranges from 5:100 to 40:100.

As mentioned above, the polymerization mixes may be added to almost any type of particle in a sub-divided state to agglomerate these into large masses, and in many cases, depending upon the application, into a single unitary cohesive mass or gel. By far, the most preferred application is that of treatment of sand. It has been determined that prior art treatments were either unable to gel the sand to any substantial degree, or the gels so formed were of inferior strength so as to be virtually useless. The problem of beach erosion is a particularly serious one and heretofore exceedingly difficult to combat. Damages due to such erosions run into multimillion dollar figures due to loss of beach and property damage. Because of such destructive erosion, shorelines may recede as much as from 30–100 feet per year. Unless the sand is gelled into masses of strength sufficient to meet the ever present movement of waters caused by various waves, currents, tides, and man-made obstructions such as seawalls, groins and inlets, such destructive unchecked erosion will continue to destroy much valuable property. When practicing the invention by contacting the sand in any one of the number of specific process embodiments which will be more fully discussed hereinafter, it has been determined that the destructive erosive force of the waves may be resisted. Also, sand when gelled to the necessary high strength through the method of the invention, thereby resisting dislodgment by the force of waves, has been found to be of long-term gel strength. Likewise, the sand gels have excellent impermeability to water and retain their flexibility and rubber-like properties due to excellent retention of water over long periods of time. The gels so formed have little tendency to dry out and thereby crumble into smaller particles which are susceptible to destructive wave forces. Moreover, the invention finds use with many types and varieties of sand, whether semi-coarse, coarse, or fine. Also, since the sand itself contains considerable amount of water, as much as about 20% by weight, the polymerization mixture may be added to such particulate sand matter in a dry mix and further water need not be added. The invention finds particular use in treatment of sand containing inorganic salts as sodium chloride as well as organic matter. Many prior art processes fail in their treatment of such composite sands.

Untreated shoreline sand may contain as much as 25% void spaces, depending on particle size, type, and amount of inorganic impurities, moisture content, type and content of calcareous skeletons of marine organisms and chitin, etc. When saturated with water, these void spaces no longer exist and static friction is thereby overcome to the point where each sand particle slips readily. Thus, under the influence of translating waves and high tides, these particles move freely. By filling up the void spaces with cross-linked polymer material, there is caused increased cohesion and adhesion of the sand particles and movement of the entire body of sand is thereby prevented.

The specific methods of applying the polymerizable mixtures of the invention may be widely varied in their scope. For example, the polymerizable mix, either in solid or solution form, may be spread over the surface of the particulate matter such as soil and then raked into intimate contact as by rakes or disc or rotary cultivators. One or more of the polymerizable ingredients going to make up the total mixture may likewise be premixed with a portion of the particulate matter such as soil and the other ingredients then added thereto. In still another embodiment, the particulate matter such as soil may be sprayed with solutions of the various components comprising the polymerization mixture in one or more applications. The soil may be plowed up either before or after the spraying operation in order to obtain the necessary intimate contact.

In yet another modification of the process of the invention, pipes or other hollow cylinders containing perforate injection nozzles may be inserted into the particulate substrate to be treated, such as the sub-surface of the ground in spaced intervals, and the polymerizable solutions injected through the nozzles under pressure. An excellent method of application involves digging of a continuous trench in the area to be treated, placing the components of the polymerization mixture in one or more applications and then filling up the trench with additional particulate matter. In such a method, a strong continuous barrier is produced which has excellent stability against elements such as moving bodies of water. Another means of applying the mixture of polymerization components involves removing the particulate matter such as soil from the area where found and intermixing it with the polymerizable components by means of such apparatus as revolving drums and the like. The composite is then laid down where desired. Yet another means of applying the mixture of polymerizable components is by using plastic or fabric containers, or other types of collapsible holders. These containers are filled with particulate matter as sand which is then saturated with the polymerizable components, or they are filled with a dry mix of sand and polymerizable ingredients and allowed to become wetted and thereby polymerize at the place of treatment. This type application is very useful in areas where the shore line has eroded to a degree that no sand is available for treatment by other described methods. This application serves to build temporary groins and jetties so that sand can be collected with incoming storms. Another advantage of this method is in the prevention of leeward groin erosion caused by shifting winds.

One of the particular advantages in the process of the invention is that the polymerizable mixture may be handled and employed as a dry mix, which concept was heretofore not available as a process variant in other prior art methods. For example, the four components may be mixed in their dry form and then shipped to the area to be treated in that particular form. Solutions may be made up on the spot and injected into the desired area of particulate matter or else the dry mix itself may be placed beneath the surface of such matter.

An excellent method of applying the compositions of the invention is to dry mix the components with a portion of the particulate matter to be treated, such as sand, soil, gravel, ground coral and other naturally occurring substances, and mix thoroughly. Sufficient water is then added to this polymerizable mixture to form a slurry. In order to be of proper consistency the slurry should generally be composed of at least 5% by weight of water and more preferably contains 10–20% by weight. The amount of each of the components of the polymerizable mix based on the total weight of the mixture should be within the ranges previously set forth. After the slurry has been constituted, it is in turn intimately contacted with additional particulate matter. Thus, for example, if the particulate matter to be treated is sand or soil, a trench may be dug and the slurry introduced into the trench to produce a continuous water-impermeable barrier, resistant to forces of water causing destructive erosion. The trench may be dug to any depth, and after the slurry has been used to partially fill the trench area, it is therefore filled with additional particulate matter until the original ground level before trenching is reached. The slurry permeates throughout the trench area and continuously polymerizes and solidified so that a relatively large area is treated and strengthened. The same type of operation may be carried out by injection of slurry into additional particulate matter.

Another method of applying the polymerizable mixture is to add the four components to water to make up a suitable solution thereof. In such a specific embodiment, it is determined that for best results the solutions should contain at least 5.0% by weight of acrylamide. Solutions as high as 40% by weight of acrylamide monomer have been prepared, giving desirable grouting results. These solutions may likewise be injected into the formation to be stabilized such as by pumping the solution out of a drum into a rod injected into the earth or other area of particulate matter such as sand. This rod, for best results, is generally inserted about three feet below the surface of particulate matter and the chemical treating solution slowly permeates throughout the area to be treated when pressure-driven through perforate openings of a nozzle connected to the rod. Generally, the area which is contacted is inversely proportional to the viscosity of the solution and the time necessary to effect polymerization or gel. Thus, by suitably adjusting the concentration of catalyst, one may slow down the gelation time to the point where a large diameter of area is treated. If extremely high strength gels are desired, catalyst concentration may be likewise increased, whereby strong durable gels set up in a minimum of time. However, the area of particulate matter which will come in contact with the polymerizing mixture will necessarily be less than in cases of use of solutions having a delayed tendency to set up into a gel. When a solution of polymerizable mixture is used, the amounts of its various components may be adjusted in accordance with ranges specifically set forth above.

It has been determined that for most efficient results, the following method is particularly desirable. A solution of acrylamide alone or in combination with some other comonomer is made up containing a suitable cross-linking agent and catalyst. In a separate mix, sand or other particulate matter is thoroughly contacted with an alkaline earth metal compound such as calcium hydroxide. The solution of acrylamide, cross-linker, and catalyst is then added to the dry mix of particulate matter and alkaline earth metal compound, whereby a composite slurry is formed containing at least 5.0% by weight of water and more preferably 10–20% by weight. In some instances additional water may be added. This slurry is added to the area to be treated by a variety of methods as discussed above. Particular desirable aspects of such a method include ease of handling of chemical treating agents, excellent dispersion of all ingredients, and particularly better contact with sand or other particular matter. Moreover, in such a method, it has been discovered that polymerization is slowed to a point where most efficient results are achieved and the operator is given sufficient time to perform his work in treating the area. Particularly, since the alkaline earth metal hydroxide or oxide has a tendency to catalyze the polymerization of acrylamide to a greater extent than when it is in sole presence of a catalyst, the method allows excellent control of the polymerization. Furthermore when the alkaline earth metal compound comes in contact with the acrylamide, high gel strengths are thereby promoted. This is the desired situation in order to obtain highest gel strength concomitant with excellent water-insolubility and water-impermeability. Also, this method overcomes the undesired tendency in solution injection techniques, for the polymerization solution to be washed away before gelation occurs or for a dilution effect to occur in the presence of moving bodies of water. Particularly, when sand is treated, solution injections are somewhat undesirable due to adverse effects of moving currents of water upon the polymerization solution. Methods of applying the polymerizable mixtures of the invention by dry mix techniques or slurry techniques overcomes this dilution effect in addition to allowing easier handling and more controllable gel times. In this particular method it has been determined that for best results the dry mix comprising the alkaline earth metal compound and portion of particulate matter should have a ratio of alkaline earth metal compound to particulate matter ranging from 1:100 to 25:100. Likewise, it is preferred that the aqueous solution contain at least 5.0% by weight of acrylamide and more preferably 5.0–40.0% by weight of acrylamide. Likewise, the total amount of acrylamide, alkaline earth metal compound, catalyst and cross-linking agent to total amount of particulate matter contact should range from 0.5:100 to 50:100 and more preferably from 5:100 to 40:100. As mentioned above, this particular method is eminently suited to treatment of sand.

It is believed that the long-term high strength imparted to aggregates formed by treating particulate matter with the polymerizable mixes of the invention is at least partially due to the following causes. The alkaline earth hydroxides or oxides, as an essential ingredient of the mix, form in the presence of carbon dioxide from air or water, extremely hard rock-like deposits of alkaline earth carbonates such as calcium carbonate. Thus, when the same reaction occurs while an alkaline earth hydroxide is in intimate contact with the acrylamide treated particulate matter, the entire mass gradually increases in strength upon standing. The ever-hardening agglomerates are able to thereby effectively withstand continual water and air erosion and maintain their integral character even in presence of fluids exerting rather high pressures. Another reason advanced for the unusually high agglomerate strength produced is that the cross-linked acrylamide in an intimate physico-chemical bound state of contact with the treated particulate matter and the alkaline earth hydroxide gradually becomes more tenuously complexed with these materials and particularly the latter over long periods of time.

In order to determine the efficacy of the invention, various experiments were conducted involving polymerizable mixtures described in detail above as well as various comparative mixtures involving prior art material. The following examples below describe these experiments in detail. These, of course, are set forth for purposes of illustration only and their detailed discussion should not be interpreted as a limitation upon the invention, except as expressed in the appended claims.

Essentially two tests were devised in order to determine the efficiency of the polymerizable mixtures of the invention as compared to known polymerization mixtures. The first involved the use of a cone penetrometer. This instrument, known as a "Precision Penetrometer," manufactured by Precision Scientific Company, has a stylus attached to the surface of a cone, and is used to test the resiliency, flexibility, and strength of formed polymerization gels. The stylus and cone are allowed to drop upon a measured volume of gel and the strength thereof is read directly on a scale according to the resistance offered to the stylus and cone by the gel. The particular model used was Serial No. K–3, which is graduated in $1/10$ millimeter divisions. The greater the strength of the gel and resistance to lowered force of cone and stylus, the lower the reading on the penetrometer scale.

The second method devised was a stress-strain measurement made on a Soiltest Unconfined Compression Tester. In this test an aqueous solution of polymerizable mixture containing various constituents of desired concentration is prepared and then mixed with the particulate matter to be treated, in this case ground coral. The entire mix of solution and coral is then placed into a cylinder two inches high having a diameter of 1¾ inches, giving a surface area of 2.3 inches. The polymerizable mix and particulate matter to be treated are then allowed to gel to a water-impermeable and water-insoluble state via the polymerization and cross-linking reaction. The ground coral gel is removed from the cylinder as a solid test button. The unsupported button is tested for unconfined compression strength. This figure is an excellent indication of gel strength, with the higher compression strength figures in terms of pounds per square inch being in direct proportionate relationship to the effectiveness of the polymerization mixture in its desired role of setting the treated particulate matter to hard cohesive masses.

For a better understanding of the invention, the following illustrative examples are given.

*Example 1*

To 90.0 grams of water were added 9.5 grams of acrylamide, 0.5 grams of methylene bisacrylamide, 2.0 grams of ammonium persulfate, and 10.0 grams of calcium hydroxide. This solution was allowed to polymerize, and within two minutes a tough resilient gel had set up. After 30 minutes a penetration reading was taken with the Penetrometer above described. This reading was 110. In like manner, a penetration was taken two hours after the gel had been formed and gave a reading of 100. The calcium hydroxide was replaced in subsequent experiments with both barium and magnesium hydroxide and results were obtained substantially comparable to those with the line.

*Example 2*

In this example the solution of Example 1 was prepared with the exception that the calcium hydroxide was omitted. The gels so formed gave a Penetrometer reading of 165 after 30 minutes and 160 after two hours standing. This demonstrates the critical necessity of inclusion of a source of alkaline earth metal hydroxide or oxide in the polymerizable mixture in order to obtain gels having the desired strength.

*Example 3*

A solution containing 9.5 grams of acrylamide, 0.5 gram of methylene bisacrylamide, 10.0 grams of calcium hydroxide, 0.5 gram of ammonium persulfate, and 0.5 gram of dimethylamino propionitrile in 90.0 grams of water was prepared and allowed to polymerize. Gel time of the polymerizable mixture was 2½ minutes. Both the 30 minute Penetrometer and 2 hour Penetrometer readings were 110.

*Example 4*

A like solution to that prepared in Example 3 was prepared but again the calcium hydroxide was omitted. The gel was then tested, and gave readings of 165 after 30 minutes and two hour standings. Again, it is seen that regardless of the catalyst system it is essential that an alkaline earth metal hydroxide compound or its parent oxide compound be employed to give tough gels.

*Example 5*

In another comparative run 9.5 grams of acrylamide, 0.5 gram of methylene bisacrylamide, 0.15 gram of ammonium persulfate, 0.375 gram of dimethylamino propionitrile and 16.0 grams of calcium nitrate were solubilized in 74.0 grams of water and allowed to gel. The penetration resistance, as a measure of gel strength, gave a reading of 145 both after 30 minute and two hour set periods.

It is seen then that inclusion of water-soluble salts, typified by calcium nitrate, in a polymerizable mixture does not increase the gel strengths of subsequently produced cross-linked polymerized masses to any substantial degree when compared to like use of relatively insoluble alkaline earth metal hydroxide or oxide compounds, such as calcium hydroxide. The latter compounds, surprisingly enough, increase gel strengths of cross-linked polyacrylamides from about 30% to about 70% more than do the water-soluble salts.

*Example 6*

In this example another water-soluble salt was investigated to determine its effect upon the gel strength of a polymerized mass of acrylamide and a cross-linking agent. Here, 9.5 grams of acrylamide, 0.5 gram of methylene bisacrylamide, 32 grams of calcium chloride, 0.5 gram of ammonium persulfate, and 0.8 gram of dimethylamino propionitrile were added to 58 grams of water. The formed gels had a penetration of 130 after both 30 minutes and two hours. Thus, it can be seen that even with gross amounts of water-soluble salts, the desired gel strength is not obtained when compared to activity of the alkaline earth hydroxides of the invention in promoting such increased strength.

*Example 7*

9.5 grams of acrylamide, 0.5 gram of methylene bisacrylamide, 20 grams of magnesium chloride, 0.5 gram of ammonium persulfate, and 0.8 gram of dimethylamino propionitrile were added to 70 grams of water and the solution allowed to polymerize and set. After 30 minutes, the penetration of the gel was 153 as measured by the above described Penetrometer. After two hours the Penetrometer reading was 140. Again, it is readily seen that water-soluble salts are substantially inferior to use of alkaline earth metal hydroxide and oxides in promoting gel strengths.

*Example 8*

To 90 grams of water were added 0.2 gram of methylene bisacrylamide, 5.8 grams of acrylamide, 4.0 grams of acrylic acid, 3.0 grams of aluminum sulfate, 0.06 gram of silver nitrate and 0.24 gram of ammonium persulfate. The mixture was neutralized to a pH of 7.0 before the alum and redox catalyst system had been added to the water solution of monomers and cross-linking agent. Gelation occurred in about 2–3 minutes and the gel strengths based on Penetrometer readings were 130 both after 30 minutes and two hours. Again, this example demonstrates that other proposed gel strengthening agents do not give the extremely high gel strengths typical of the alkaline earth metal hydroxide compound activators.

Example 9

10 grams of calcium hydroxide were mixed with 450 grams of finely ground coral. In a separate solution 9.5 grams of acrylamide, 0.5 gram of methylene bisacrylamide, 0.5 gram of ammonium persulfate, and 0.5 gram of dimethylamino propionitrile were dissolved in 90 grams of water. The polymerizable solution was added to the intimate dry mix of coral and calcium hydroxide and further mixed to form a slurry. This slurry was placed into cylinders as described above, allowed to set and tested for unconfined compression strentgh. Two separate molds gave strengths of 84 and 86 pounds respectively at the cross-sectional area of 2.3 inches. Thus, it is again demonstrated through another testing procedure that the polymerizable mixes of the invention imparted excellent cohesive properties to particulate matter, and in this case, ground coral. The hard mass of coral in combination with the polymer mix had excellent resistance to vertical compression even in the absence of lateral support.

Example 10

This example was run exactly according to the procedure of Example 9 with the exception that the calcium hydroxide content was increased to 20 grams. The compressive strengths of two samples tested were 132 pounds and 125 pounds respectively. Thus, it is shown that increasing the amount of gel strength promoter materially increases the desired strength of gel of particulate matter in combination with the polymerized mixture.

Example 11

This example was run exactly according to the techniques outlined in Example 9 with the exception that the calcium hydroxide was omitted. The compression strengths of two samples of molds so formed were 50 and 46 pounds respectively. Without benefit of alkaline earth metal hydroxide strength promoting compounds, the gel strengths of particulate matter, examplified by ground coral, in intimate contact with a polymerized solution of acrylamide and a cross-linking agent are vastly inferior to those produced with benefit of such additives. Likewise, water-soluble salts of the type employed above were added in various experiments to polymer solutions of acrylamide, methylene bisacrylamide and catalyst and in turn slurried with ground coral. In each case, the compressive strengths of molds so formed were well below molds formed by contact of the coral with the polymerizable mixtures of the invention. Molds formed including these water-insoluble salts had compressive strengths varying from 25 to 75% less than comparative mold samples employing alkaline earth metal hydroxide activators.

Example 12

This example illustrates that high strength gels of particulate matter induced by the polymerizable mixtures of the invention may be formed even under adverse field conditions of continual water pressure, and can withstand, due to such high gel strength, continuous forces of rushing currents and waves. On a beach site 453 pounds of a coarse sand containing generally 10–20% by weight of water were mixed with 9.5 pounds of acrylamide, 0.5 pound of methylene bisacrylamide, and 10.0 pounds of hydrated lime, along with 10 additional pounds of water and 2 pounds of ammonium persulfate. The above ingredients were mixed thoroughly into a slurry which was in turn placed into a predug trench on the beach site. After three minutes it was noted that a strong gel was formed. The trench was then filled in with additional sand and effect of water erosion observed for a period of approximately a week. It was noted that the gelled sand barrier so produced maintained its structure during this time, and its integral character was not in any way eroded by the rushing water waves. Like experiments were conducted with ground coral rock and a finer type sand and similar results obtained.

Also, molds containing the same proportions of materials as above except in reduced quantities were formed and placed on the beach. After a period of eight days the molds, though subjected to continual wave forces maintained their mechanical integrity throughout this period and again substantially prevented erosion of the beach area in which they were placed.

Example 13

At the same beach site a solution of 360 pounds of water, 39.6 pounds of acrylamide, 0.4 pound of methylene bisacrylamide, 1.6 pounds of dimethylamino propionitrile, and 498 grams of ammonium persulfate was prepared and injected to a depth of 4 feet into the beach area. In many cases, the above solution was carried away and diluted by the water before it had any opportunity to polymerize. In those areas in which gels were produced, they had poor strength and did not last for a sufficiently long time to afford noticeable protection against water erosion. It is again apparent that the alkaline earth hydroxide compound is necessary to produce hard, firm gels of long lasting duration.

Example 14

This experiment was also conducted at the site of a beach which had through the years been continually eroded whereby its depth had been reduced to about ⅓ its original dimension. 90 pounds of a fine to semi-coarse sand was mixed with 1.8 pounds of acrylamide and 0.2 pound of methylene bisacrylamide. These were mixed thoroughly and to this was added a solution containing two pounds of hydrated lime which had been previously dispersed in six quarts of water. Mixing of the polymer-sand mix and lime was then effected. Lastly, six ounces of ammonium persulfate in two quarts of water were added to the above slurry and more mixing carried on. The entire batch was then placed in polyethylene bags and formed into molds, and within twenty minutes a firm, tough, resistant sand gel had been formed. These molds were placed on the beach after the polyethylene bags had been removed and then buried in sand 2–3 feet below the surface of the sand. The molds helped to maintain the character of the surrounding area, and even in the presence of very high seas maintained their own integral character. This particular method is an excellent means of preventing erosion of beach areas whereby such effect of destructive water forces can be reduced to the point where beach depths can be maintained even under conditions of extreme water pressures and erosion caused by turbulent storms.

Example 15

Into a 55-gallon drum were added 235 pounds of water, 67.5 pounds of acrylamide and 7.5 pounds of methylene bisacrylamide along with 3.0 pounds of dimethylamino propionitrile. The solution was thoroughly agitated after addition of the above components. Into a second 55-gallon drum were added four pounds of ammonium persulfate and 400 pounds of water. Equal volume pumps were used on each tank and the solutions mixed at the header valves prior to injection into the beach even at an approximately three-foot depth. As the tide increased, the sand around the injected area was slowly washed away and through wave attrition the sand gel was gradually broken until after 16 hours the sand gel itself and adjacent sand had completely disappeared. In a subsequent comparative experiment involving also addition of 67.5 pounds of calcium hydroxide to the monomer solution, sand gels were formed which showed little tendency to disintegrate even after seven weeks under heavy NE. and SE. winds with waves up to 10 feet high. This demonstrates again that in order to withstand the erosive effect of the translating waves in a beach area, it is absolutely essentially to agglomerate or gel the sand with a polymerizable mix containing an alkaline earth metal hydroxide compound such as calcium hydroxide.

In addition to imparting excellent gel strength to particulate matter so treated with the polymerizable mixture of the preferred type described above, the gelled particulate matter remained in a cohesive state upon long-term standing and had little tendency to lose the water entrapped therein. The gels maintained their integral character, and remained in the desired flexible and resilient state over long periods of time. Particularly, the gels or cohesive masses of particulate matter and polymerized mixes of the invention showed no tendency whatsoever to fragment or crumble into smaller units even when some previously retained moisture had been lost.

The invention is hereby claimed as follows:

1. A process of aggregating particulate matter to produce exceptionally high strength agglomerates thereof which comprises the steps of contacting said matter in the presence of water with a polymerizable mixture comprising 10–49% by weight of an acrylamide based monomer, 0.1–4.0% by weight of a cross-linking agent capable of reaction with said acrylamide, 0.2–8.0% by weight of a catalyst, and 10–49% by weight of an alkaline earth metal compound selected from the group consisting of hydroxides and oxides, and effecting polymerization of said mixture in the presence of said particulate matter whereby said matter and said mixture are converted to a substantially water-impermeable mass, further characterized as possessing superior strength.

2. The process of claim 1 wherein the ratio of said mixture added to said particulate matter ranges from 0.5:100 to 50:100.

3. The process of claim 1 wherein said particulate matter is sand.

4. A process of aggregating naturally occurring particulate matter to produce exceptionally high strength agglomerates thereof which comprises the steps of contacting a portion of said matter with a dry polymerizable mixture comprising 10–49% by weight of an acrylamide based monomer, 0.1–4.0% by weight of a cross-linking agent capable of reaction with said acrylamide, 0.2–8.0% by weight of a catalyst and 10–49% by weight of an alkaline earth metal compound selected from the group consisting of hydroxides and oxides, adding sufficient water to form a slurry of said mater and said mixture, contacting said slurry with additional particulate matter whereby said additional particulate matter and said slurry are converted to a substantially water-impermeable mass, further characterized as possessing superior strength.

5. The process of claim 4 wherein said polymerizable mixture comprises acrylamide, an alkylidene bisacrylamide, a water-soluble persulfate salt selected from the group consisting of ammonium and alkali metal salts, and calcium hydroxide.

6. The process of claim 4 wherein said slurry comprises at least 5.0% water.

7. The process of claim 4 wherein said polymerizable mixture comprises acrylamide, alkylidene bisacrylamide, calcium hydroxide, and a water-soluble persulfate salt selected from the group consisting of ammonium and alkali metal salts.

8. The process of claim 4 wherein the ratio of said polymerization mixture added to the total amount of particulate matter contacted ranges from 0.1:100 to 50:100.

9. The process of claim 4 wherein said slurry comprises a ratio of polymerizable mixture to particulate matter ranging from 2:100 to 75:100.

10. The process of claim 4 wherein said particulate matter comprises sand.

11. A process of aggregating particulate matter to produce exceptionally high strength agglomerates thereof which comprises the steps of mixing a portion of said matter and an alkaline earth metal compound selected from the group consisting of hydroxides and oxides to form a mix thereof, adding to said mix a polymerizable aqueous solution comprising an acrylamide based monomer, a cross-linking agent capable of reaction with said acrylamide, and a catalyst whereby a slurry is formed, contacting said slurry with additional particulate matter, and effecting polymerization of said slurry in the presence of said additional particulate matter whereby said additional particulate matter and said slurry are converted to a substantially water-impermeable mass, further characterized as possessing superior strength, said alkaline earth metal compound and said acrylamide based monomer each being present in an amount of 10–49% by weight, said cross-linking agent being present in an amount of 0.1–4.0% by weight and said catalyst being present in an amount of 0.2–8.0% by weight, each of said above weight percentages being based on the total weight of the combination of said acrylamide based monomer, said cross-linking agent, said catalyst and said alkaline earth metal compound.

12. The process of claim 11 wherein the ratio of said alkaline earth metal compound to said portion of particulate matter ranges from 1:100 to 25:100.

13. The process of claim 11 wherein the ratio of the total amount of acrylamide, alkaline earth metal compound, catalyst and cross-linking agent to total amount of particulate matter contacted ranges from 0.5:100 to 50:100.

14. The process of claim 11 wherein said alkaline earth metal compound is calcium hydroxide, and said polymerizable aqueous solution comprises acrylamide, alkylidene bisacrylamide, and a water-soluble persulfate salt selected from the group consisting of ammonium and alkali metal salts.

15. The process of claim 11 wherein said particulate matter is sand.

16. A process of aggregating and stabilizing soil which comprises the steps of injecting beneath the surface of such soil in the presence of water a polymerizable mixture comprising 10–49% by weight of an acrylamide based monomer, 0.1–4.0% by weight of a cross-linking agent capable of reaction with said acrylamide, 0.2–8.0% by weight of a catalyst and 10–49% by weight of an alkaline earth metal compound selected from the group consisting of hydroxides and oxides, and effecting polymerization of said mixture in the presence of said soil whereby said soil and said mixture are converted to a substantially water-impermeable mass, further characterized as possessing superior strength.

17. A process of sealing a porous earth formation adjoining a channel in the earth which comprises injecting into the porous formation in the presence of water a polymerizable mixture comprising 10–49% by weight of an acrylamide based monomer, 0.1–4.0% by weight of a cross-linking agent capable of reaction with said acrylamide, 0.2–8.0% by weight of a catalyst and 10.49% by weight of an alkaline earth metal compound selected from the group consisting of hydroxides and oxides, and effecting polymerization of said mixture in the presence of said porous earth formation whereby said earth formation and said mixture are converted to a substantially water-impermeable mass, further characterized as possessing superior strength.

18. In a process of drilling into earth formations which comprises the steps of sealing a strata in the earth by injecting into said earth in the presence of water a polymerizable mixture comprising 10–49% by weight of an acrylamide based monomer, 0.1–4.0% by weight of a cross-linking agent capable of reaction with said acrylamide, 0.2–8.0% by weight of a catalyst and 10–49% by weight of an alkaline earth metal compound selected from the group consisting of hydroxides and oxides, and effecting polymerization of said mixture in the presence of said earth whereby said earth and said mixture are converted to a substantially water-impermeable mass, further characterized as possessing superior strength.

19. A process of aggregating sand to produce gels of exceptional high strength which comprises the steps of contacting said sand in the presence of water with a polymerizable mixture comprising 10–49% by weight of an acrylamide based monomer, 0.1–4.0% by weight of alkylidene bisacrylamide, 0.2–8.0% by weight of a water-soluble persulfate catalyst salt selected from the group consisting of ammonium and alkali metal salts, and 10–49% by weight of calcium hydroxide, and effecting polymerization of said mixture in the presence of said sand whereby said sand and said mixture are converted to a substantially water-impermeable and water-insoluble gel state of superior strength.

20. The process of claim 19 wherein the ratio of said polymerizable mixture to said sand ranges from 0.5:100 to 50:100.

References Cited by the Examiner

UNITED STATES PATENTS

| | | | |
|---|---|---|---|
| 2,801,983 | 8/1957 | Dixon | 61—36 X |
| 2,801,984 | 8/1957 | Morgan | 61—36 X |
| 2,801,985 | 8/1957 | Roth | 260—41 |
| 2,838,466 | 6/1958 | Padbury | 61—36 |
| 2,856,380 | 10/1958 | Roth | 260—41 |
| 2,865,177 | 12/1958 | Gnaedinger | 61—36 |
| 2,898,320 | 8/1959 | Sprague | 260—41 |
| 3,021,298 | 2/1962 | Rakowitz | 61—36 X |
| 3,056,757 | 10/1962 | Rakowitz | 260—41 |

OTHER REFERENCES

Thorne et al.: "Inorganic Chemistry," page 446, Interscience Pub. Inc., 1954 6th English edition, N.Y., QD15E64aE.

CHARLES E. O'CONNELL, *Primary Examiner.*

JACOB L. NACKENOFF, *Examiner.*

J. E. MURTAGH, *Assistant Examiner.*